United States Patent Office 3,152,154
Patented Oct. 6, 1964

3,152,154
17-MONOESTERS OF 17α,21-DIHYDROXY STEROIDS AND PROCESS FOR THE PREPARATION THEREOF
Alberto Ercoli, Milan, and Rinaldo Gardi, Carate Brianza, Milan, Italy, assignors to Francesco Vismara S.p.A., Casatenovo (Como), Italy, a corporation of Italy
No Drawing. Filed June 11, 1962, Ser. No. 201,297
Claims priority, application Italy, June 24, 1961, 11,659/61
22 Claims. (Cl. 260—397.45)

The present invention relates to novel 17α-acyloxy-21-hydroxy steroids of the pregnane series and to a method of preparing the same. More particularly this invention relates to a method of converting a 17α,21-(1'-alkoxy)-1'-substituted methylenedioxy steroid of the pregnane series to a corresponding 17α-acyloxy-21-hydroxy steroid of the pregnane series.

The conventional procedures for esterification of a 17α,21-dihydroxy steroid usually lead to a 21-acyloxy derivative or, when more drastic conditions are employed, to the corresponding 17α,21-diacyloxy steroid. A method is not known for selectively acylating in a 17α,21-dihydroxy steroid, the tertiary hydroxy group at the 17-position in the presence of the primary hydroxy group at the 21-position. On the other hand means have not been disclosed for selectively hydrolyzing an acyloxy group at the 21-position in a 17α,21-diacyloxy steroid. Therefore, 17-monoesters of 17α,21-dioxygenated steroids of the pregnane series have been inaccessible up to now.

We have found that such 17α-acyloxy-21-hydroxy derivatives are now obtainable by subjecting 17α,21-(1'-alkoxy)-1'-substituted methylenedioxy steroids of the pregnane series to acid hydrolysis.

The invention thus provides a new series of 17-monoesters of 17α,21-dihydroxy-20-keto pregnanes having at the 17-position the structure:

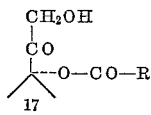

where R is a member selected from the group consisting of aliphatic hydrocarbon radicals containing from 1 to 9 carbon atoms, cycloaliphatic hydrocarbon radicals of from 4 to 6 carbon atoms, arylaliphatic hydrocarbon radicals having 7 or 8 carbon atoms, phenyl, β-carboxy-ethyl and β-carbomethoxy-ethyl.

According to our invention the 17-monoesters of 17α,21-dihydroxy steroids are obtained by hydrolysis of the corresponding 17α,21-(1'-alkoxy)-1'-substituted methylenedioxy steroids of the pregnane series having at the 17, 20 and 21-positions the structure:

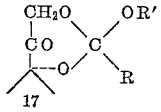

where R is as defined above and R' represents a lower alkyl radical of from 1 to 3 carbon atoms, inclusive, preferably a methyl or ethyl group.

The cyclopentanopolyhydrophenanthrene nucleus which is not shown in the above formula is generally substituted at the 3-position with an oxygenated function, such as a keto group or a hydroxy group. If a hydroxy group is present, it may be protected in the form of an ether group containing a lower alkyl radical of from 1 to 3 carbon atoms or in the form of an ester group containing a lower alkanoyl radical of from 1 to 3 carbon atoms or a benzoyl radical. The steroid may also contain substituents such as hydroxy, keto, halogen, ether and methyl groups at other positions of the cyclopentanopolyhydrophenanthrene nucleus, as for instance at positions 1, 2, 4, 6, 7, 9, 11, 16. The steroid may be completely saturated or have one or more double bonds, as for instance in the 1:2, 3:4, 4:5, 5:6 and/or 9:11 positions of the molecule. The substituents and the double bonds do not interfere with the present process for converting a 17α,21-(1'-alkoxy)-1'-substituted methylenedioxy steroid of the pregnane series to the corresponding 17α-acyloxy-21-hydroxy steroid.

The starting materials for our process are made by treating a 17α,21-dihydroxy-20-ketosteroid of the pregnane series with a lower alkyl ester of an orthocarboxylic acid of the formula R—C(OR$^1$)$_3$, where R and R$^1$ are as defined above, in the presence of an acid catalyst and in solution in an organic solvent at a temperature ranging from 60° C. to 130° C., as described in our copending application Serial No. 201,295, filed on June 11, 1962.

As may be seen from the partial formulae above, the nature of the acyl radical R—CO of the 17α-acyloxy-21-hydroxy steroid, obtained by the process of this invention, depends on the particular orthoester with which the 17α,21-dihydroxy steroid is reacted. Thus for instance, if the methyl or ethyl ester of ortho-acetic acid is employed 17α,21-(methoxy or ethoxy)-ethylidenedioxy steroid is obtained which is converted according to the process of this invention to the corresponding 17α-acetoxy-21-hydroxy steroid.

Likewise, a 17α,21-(ethoxy)-propylidenedioxy, 17α,21-(ethoxy)-butylidenedioxy, 17α,21 - (ethoxy)-pentylidenedioxy, 17α,21-(ethoxy)-hexylidenedioxy, or a 17α,21-(1'-methoxy-3'-carboxy)-propylidenedioxy steroid compound may be obtained by the reaction of the 17α,21-dihydroxy compound with ethylorthopropionate, ethylorthobutyrate, ethylorthovalerate, ethylorthocaproate or β-carboxy methylorthopropionate and converted by acid hydrolysis to the 17α,21-dihydroxy, 17-propionate, 17-butyrate, 17-valerate, 17-caproate, 17-hemisuccinate, respectively.

Exemplary of 17α,21-(1'-alkoxy)-1'-substituted methylenedioxy steroids which are converted by our process to 17α-acyloxy-21-hydroxy steroids are:

17α,21-(1'-methoxy)-ethylidenedioxy - 4 - pregnene-3,20-dione;
17α,21-(1'-methoxy)-pentylidenedioxy - 4-pregnene-3,20-dione;
17α,21 - (1' - methoxy) - ethylidenedioxy - 4 - pregnene-3,11,20-trione;
17α,21-(1'-methoxy)-ethylidenedioxy - 4 - pregnene-11β-ol-3,20-dione;
17α,21-(1'-methoxy)-pentylidenedioxy - 4 - pregnene-11β-ol-3,20-dione;
17α,21-(1'-methoxy)-ethylidenedioxy - 1,4 - pregnadiene-3,11,20-trione;
17α,21-(1'-methoxy)-pentylidenedioxy - 1,4 - pregnadiene-3,11,20-trione;
17α,21-(1'-methoxy-3'-carboxy) - propylidenedioxy-1,4-pregnadiene-3,11,20-trione;
17α,21-(1'methoxy)-ethylidenedioxy - 1,4 - pregnadiene-11β-ol-3,20-dione;
17α,21-(1'-methoxy)-pentylidenedioxy - 1,4 - pregnadiene-11β-ol-3,20-dione;
17α,21-(1'-methoxy)-hexylidenedioxy - 1,4 - pregnadiene-11β-ol-3,20-dione;
17α,21-(1'-methoxy)-heptylidenedioxy - 1,4 - pregnadiene-11β-ol-3,20-dione;
17α,21-(1'-methoxy-3' - carboxy) - propylidenedioxy-1,4-pregnadiene-11β-ol-3,20-dione;
17α,21-(1'-methoxy)-ethylidenedioxy-9α-fluoro-1,4-pregnadiene-11β-ol-3,20-dione;

17α,21-(1'-methoxy)-ethylidenedioxy-5α-pregnane-3,11β-diol-20-one;

17α,21-(1'-methoxy)-ethylidenedioxy-5α-pregnane-11β-ol-3,20-dione;

3β-ethoxy-17α,21-(1'-methoxy)-ethylidenedioxy-5α-pregnane-20-one;

17α,21-(1'-methoxy)-ethylidenedioxy-5α-pregnane-3,11,20-trione;

17α,21-(1'-methoxy)-ethylidenedioxy-4,9(11)-pregnadiene-3,20-dione;

17α,21-(1'-ethoxy)-benzylidenedioxy-4-chloro-5α-pregnane-3,20-dione;

17α,21-(1'-propoxy)-iso-pentylidenedioxy-4-bromo-5α-pregnane-3,20-dione;

17α,21-(1'-methoxy)-propylidenedioxy-5α-pregnane-4-ol-3,20-dione;

17α,21-(1'-ethoxy)-butylidenedioxy-6-methyl-1,4-pregnadiene-11β-ol-3,20-dione;

17α,21-(1'-methoxy)-butylidenedioxy-6-fluoro-4-pregnene-3,11,20-trione;

17α,21-(1'-ethoxy)-pentylidenedioxy-19-nor-4-pregnene-11β-ol-3,20-dione;

17α,21-(1'-ethoxy)-ethylidenedioxy-4-pregnene-6-ol-3,20-dione;

17α,21-(1'-methoxy)-hexylidenedioxy-4-pregnene-6,11β-diol-3,20-dione;

17α,21-(1'-methoxy)-octylidenedioxy-16β-methyl-1,4-pregnadiene-11β-ol-3,20-dione;

17α,21-(1'-iso-propoxy)-ethylidenedioxy-9α-fluoro-16α-methyl-1,4-pregnadiene-11β-ol-3,20-dione;

17α,21-(1'-methoxy)-ethylidenedioxy-9α-chloro-4-pregnene-11β-ol-3,20-dione;

17α,21-(1'-methoxy)-pentylidenedioxy-2α-methyl-4-pregnene-3,11,20-trione;

17α,21-(1'-ethoxy)-decylidenedioxy-1,4-pregnadiene-11β-ol-3,20-dione;

17α,21-(1'-methoxy)-benzylidenedioxy-1,4-pregnadiene-3,11,20-trione;

17α,21-(1'-methoxy-1'-cyclopentyl)-methylenedioxy-4-pregnene-3,11,20-trione;

17α,21-(1'-ethoxy-3'-phenyl)-propylidenedioxy-4-pregnene-3,11,20-trione;

17α,21-(1'-methoxy-1'-cyclobutyl)-methylenedioxy-4-pregnene-3,11,20-trione;

17α,21-(1'-ethoxy)-hexahydrobenzylidenedioxy-4-pregnene-3,20-dione;

17α,21-(1'-methoxy)-cynnamylidenedioxy-4-pregnene-11β-ol-3,20-dione;

17α,21-(1'-methoxy)-pentylidenedioxy-9α-fluoro-1,4-pregnadiene-11β,16α-diol-3,20-dione.

In carrying out the process of this invention the 17α,21-(1'-alkoxy)-1'-substituted-methylenedioxy steroid of the pregnane series suspended or dissolved in an organic reaction medium, is treated with an aqueous acid, which may be a mineral acid or an organic acid. The acid reagent may be dilute or concentrated. Preferred mineral acids are hydrochloric acid, sulfuric acid, phosphoric acid, boric acid, perchloric acid, hydrochloric acid being particularly preferred. The organic acids may be selected from formic acid, acetic acid, propionic acid, chloroacetic acid, oxalic acid and malonic acid, oxalic acid being preferred.

The organic reaction medium is preferably an alcohol, such as methanol, ethanol, propanol, cyclohexanol, benzyl alcohol and the like. Alternatively, aromatic hydrocarbon solvents, for instance, benzene or toluene, ethers, cycloalkanes or halogenated alkane solvents may advantageously be used as media for the reaction. Moreover an organic acid, itself, may be employed as both reaction medium and acid reagent.

The acid hydrolysis of the 17α,21-(1'-alkoxy)-1'-substituted methylenedioxy steroid may be carried out at any temperature between 0° and 100° C. but we prefer to use a temperature of from about 20° C. to about 80° C. The reaction time can vary greatly depending on the reaction temperature as well as on the particular nature of the steroid starting material and the acidic reagent employed. Generally, the reaction time is from a few minutes to about two hours at temperatures from about 20–80° C. Practically the sole product of the acid hydrolysis of a 17α,21-(1'-alkoxy)-1'-substituted-methylenedioxy steroid is the corresponding 17α-acyloxy-21-hydroxy derivative. Thus the product can be readily isolated from the reaction mixture by removing the solvent, preferably by evaporation under reduced pressure, and purifying the crystalline residue by recrystallization.

The structure of the 17α-acyloxy-21-hydroxy steroid was assigned on the basis of infrared spectra and confirmed by conversion to the corresponding 17α,21-diacyloxy derivative by mild acylation, thus obtaining a 17α-21-diester identical with the product prepared by direct esterification of the corresponding 17α,21-dihydroxy steroid.

Because of the presence of a free hydroxy group at the 21-position, the new 17α-acyloxy-21-hydroxy steroids of the pregnane series are useful as intermediates for the preparation of physiologically active steroid compounds. For instance, the 21-hydroxy group can be substituted with halogen atoms, particularly chlorine or fluorine, according to known procedures, thus obtaining 17α-acyloxy-21-chloro or fluoro steroids such as 17α-acyloxy-21-chloro- or fluoro-progesterone and 6-methyl derivatives thereof which are very active as progestational agents.

Alternatively, the 21-hydroxy group may be replaced with a hydrogen atom by first treating the 17α-acyloxy-21-hydroxy steroid with p. toluensulfonic acid and then reacting the 21-tosylate with hydriodic acid to give the corresponding 17α-acyloxy-21-desoxy steroid, such as 17α-acyloxy progesterone. The esters of 17α-hydroxy progesterone are, in several cases, very difficult to prepare by direct acylation, particularly when the acyl group to be introduced in the 17-position is that of a higher molecular weight aliphatic acid, such as valeric acid, caproic acid, oenanthic acid, caprylic acid and the like.

Furthermore, the 21-hydroxy group of the 17α-acyloxy-21-hydroxy steroid may be acylated to give a 17α,21-diacyloxy derivative.

The possibility of acylating at the 21-position in the presence of a preformed 17α-acyloxy group permits the obtaining of mixed 17,21-diesters in which the acyl group at the 17-position is different from that introduced at the 21-position. For instance, cortisol 17α-valerate or prednisolone 17α-valerate can be converted by acetylation to cortisol 17α-valerate-21-acetate, or prednisolone 17α-valerate-21-acetate. The mixed diesters increase the solubility of the steroid hormone in vegetable oils or lipid carriers for therapeutic purposes.

In addition to their utility as intermediates for the preparation of physiologically active steroid compounds, certain of the 17α-acyloxy, 21-hydroxy-20-ketopregnanes of this invention are also useful for their hormonal properties. For instance, the 17-monoesters, particularly the 17-valerate of cortisone, cortisol, prednisone and prednisolone are very active as anti-inflammatory agents. Moreover, the 17-monoesters such as the 17-acetate, 17-valerate, 17-caproate and 17-hemisuccinate of 4-pregnene-17α,21-diol-3,20-dione and 9α-fluoro-11β-hydroxy derivatives thereof possess pronounced progestational activity.

The following examples are given for purposes of illustrating the invention, but are not to be construed as limiting the same:

*Example 1*

A solution of 1.5 g. of 17α,21-(1'-methoxy)-ethylidenedioxy-4-pregnene-3,20-dione in 40 cc. of methanol is treated on a water bath at 35–40° C. for approximately 10 minutes with 30 cc. of 2 N oxalic acid. The solvent is evaporated under reduced pressure and the resulting residue is crystallized from a small amount of methanol to give 4-pregnene-17α,21-diol-3,20-dione 17-acetate, M. Pt. 205–206° C.; [α]$_D$=+31° (dioxan).

Example 2

1 g. of 17α,21-(1'-methoxy)-pentylidenedioxy-4-pregnene-3,20-dione dissolved in 30 cc. of ethanol, is treated with 0.5 cc. of 2 N hydrochloric acid. After 5 minutes' heating at 40° C., the resulting mixture is evaporated to give as a residue 4-pregnene-17α,21-diol-3,20-dione 17-valerate which upon recrystallization from ethanol melts at 115–118° C.; $[\alpha]_D = +33°$ dioxan). By employing as starting product, 17α,21-(1'-methoxy)-hexylidenedioxy-4-pregnene-3,20-dione, and following the same procedure as above, 4-pregnene-17α,21-diol-3,20-dione 17-caproate is obtained.

Example 3

To a solution of 400 mg. of 17α,21-(1'-methoxy-3'-carboxy)-propylidenedioxy-4-pregnene-3,20-dione in 10 cc. of methanol are added 0.5 cc. of 2 N hydrochloric acid. After 5 minutes heating at 55° C., the solvent is evaporated and the residue, taken up with dilute ethanol, gives 4-pregnene-17α,21-diol-3,20-dione 17-hemisuccinate.

Following the same procedures as above and using 17α,21-(1'-methoxy)-ethylidenedioxy-4,9(11)-pregnadiene-3,20-dione as starting product, 4,9(11)-pregnadiene-17α,21-diol-3,20-dione 17-acetate is obtained.

Example 4

2 g. of 17α,21-(1'-methoxy)-ethylidenedioxy-4-pregnene-3,11-20-trione are dissolved in 25 cc. of methanol and treated with 3 cc. of 1 N oxalic acid for one or two minutes at a temperature of 40° C. The reaction diluent is evaporated, the residue is taken up with dilute methanol, and the impurities are eliminated by filtration. The mother liquors evaporated and taken up with acetone-hexane, yield 4-pregnene-17α,21-diol-3,11,20-trione 17-acetate, M. Pt. 194–198° C.; $[\alpha]_D = +104°$ (dioxan).

The infrared spectrum of cortisone 17-acetate shows the typical bands of the acetate; moreover the shift of the bands of the carbonyl and 20-keto groups towards higher frequencies confirmed the presence of an acyloxy group adjacent to the 20-keto group. Since the new ester differs from the well known 21-ester, it is obviously the 17α-monoester.

By acylating 4-pregnene-17α,21-diol-3,11,20-trione 17-acetate with acetic anhydride in pyridine at room temperature, 4-pregnene-17α,21-diol-3,11,20-trione 17,21-diacetate is obtained. Since such acylation conditions do not usually affect the 17α-hydroxyl group, the starting product is a 17α-acetate. The resulting product, when mixed with an authentic specimen prepared by energic acylation of the 17α,21-dihydroxy steroid (R. B. Turner, J. Amer. Chem. Soc. 75, 3489; 1953), does not show depression of the melting point.

Example 5

By subjecting a mixture consisting of 1 g. of 17α,21-(1'-methoxy)-pentylidenedioxy-4-pregnene-3,11,20-trione in methanol and 0.5 cc. of 1 N hydrochloric acid to the reaction sequence described in Example 2, 4-pregnene-17α,21-diol-3,11,20-trione 17-valerate is prepared.

Similarly, by substituting the hexylidenedioxy and 3'-phenylpropylidenedioxy derivatives for the pentylidenedioxy derivative, there are obtained 4-pregnene-17α,21-diol-3,11,20-trione 17-caproate and 4-pregnene-17α,21-diol-3,11,20-trione 17(β-phenyl)propionate.

Example 6

2.5 g. of 17α,21-(1'-methoxy)-ethylidenedioxy-4-pregnene-11β-ol-3,20-dione dissolved in 25 cc. of methanol are treated with 5 cc. of N/2 oxalic acid and heated for two minutes at 40° C. The resulting reaction mixture is evaporated and the residue is taken up with dilute methanol. After filtration the motor liquors are evaporated and a residue separates which taken up with acetone-hexane yields 1.5 g. of 4-pregnene-11β,17α,21-triol-3,20-dione 17-acetate, M. Pt. 234–237° C.; $[\alpha]_D = +50°$ (dioxan).

The substitution of an equivalent quantity of 17α,21-1'-propoxy)-pentylidenedioxy-4-pregnene-11β-ol-3,20-dione in the process of this example results in 4-pregnene-11β,17α,21-triol-3,21-dione 17-valerate, M. Pt. 159–161° C.; $[\alpha]_D = +37°$ (dioxan).

Example 7

1.5 g. of 17α,21-(1'-methoxy)-ethylidenedioxy-1,4-pregnadiene-3,11,20-trione are treated with 20 cc. of methanolic 2 N acetic acid. The reaction mixture, heated at 25° C. for 5 minutes, is then evaporated to give as a residue 1,4-pregnadiene-17α,21-diol-3,11,20-trione 17-acetate which, recrystallized from dilute methanol, melts at 193–195° C.; $[\alpha]_D = +86°$ (dioxan).

Similarly, 1,4-pregnadiene-17α,21-diol-3,11,20-trione 17-hemisuccinate, melting at 207–210° C.; $[\alpha]_D = +76°$ (dioxan), is prepared by subjecting 17α,21-(1'-methoxy-3'-carboxy)-propylidenedioxy-1,4-pregnadiene-3,11,20-trione to the procedure described above.

Example 8

1 g. of 17α,21-(1'-methoxy)-pentylidenedioxy-1,4-pregnadiene-3,11,20-trione dissolved in 25 cc. of dioxan is treated at room temperature with 30 cc. of N/10 sulfuric acid for 10 minutes. The reaction mixture is then evaporated under reduced pressure, the residue crystallized from a small amount of dilute methanol and 1,4-pregnadiene-17α,21-diol-3-11,20-trione 17-valerate is obtained in quantitative yield, M. Pt. 198–201° C.; $[\alpha]_D = +70°$ dioxan).

By acylating the thus prepared compound with acetic anhydride in pyridine at room temperature 1,4-pregnadiene-17α,21-diol-3,11,20-trione 17-valerate-21-acetate, M. Pt. 132–133° C.; $[\alpha]_D = +85°$ (dioxan), is obtained.

Example 9

To 3 cc. of methanol containing 300 mg. of 17α,21-(1'-methoxy)-ethylidenedioxy-1,4-pregnadiene-11β-ol-3,20-dione are added 0.5 cc. of 2 N oxalic acid and the mixture is heated at 40–50° C. for 5 minutes. The liquid is completely evaporated to obtain a solid residue which, taken up with dilute methanol, yields 240 mg. of crude product melting at 217–223° C. This product is dissolved in dilute methanol and the impurities are eliminated by filtration. The motor liquors are evaporated and the product, recovered by filtration and crystallized from acetone-hexane, yields 1,4-pregnadiene-11β,17α,21-triol-3,20-dione 17-acetate, M. Pt. 240–242° C.; $[\alpha]_D = +10°$ (dioxan).

Example 10

2 g. of 17α,21-(1'-methoxy)-pentylidenedioxy-1,4-pregnadiene-11β-ol-3,20-dione dissolved in 60 cc. of methanol are treated with 20 cc. of 2 N hydrochloric acid in methanol.

After standing for 10 minutes at room temperature, the mixture is evaporated under reduced pressure and the residue, crystallized from diluted methanol, yields 1,4-pregnadiene-11β,17α,21-triol-3,20-dione 17-valerate in quantitative yield. M. Pt. 210–213° C.; $[\alpha]_D = +3.5°$ (dioxan).

Example 11

In the manner described in Example 2, 1 g. of 17α,21-(1'-methoxy)-hexylidenedioxy-1,4-pregnadiene-11β-ol-3,20-dione in solution in 30 cc. of ethanol is treated with 15 cc. of N/10 hydrochloric acid in methanol. The resultant product is isolated in the described manner and crystallized from ethanol to give 1,4-pregnadiene-11β,17α,21-triol-3,20-dione 17-caproate, M. Pt. 169–171° C.; $[\alpha]_D = -1.5°$ (dioxan).

Similarly, by substituting an equivalent quantity of 17α,21-(1'-methoxy)-heptylidenedioxy-1,4-pregnadiene-11β-ol-3,20-dione and treating with a phosphoric acid solution according to normal procedure, 1,4-pregnadiene-11β,17α,21-triol-3,20-dione 17-oenanthate is obtained.

In a similar manner, starting from the corresponding 17α,21 - (1' - methoxy - 3' - carboxy) - propylidenedioxy-1,4-pregnadiene-11β-ol-3,20-dione, 1,4-pregnadiene-11β,17α,21-triol-3,20-dione 17-hemisuccinate melting at 211–213° C.; [α]$_D$=+15° (dioxan) is prepared.

*Example 12*

A solution of 3 g. of 17α,21-(1'-methoxy)-ethylidenedioxy - 9α - fluoro - 1,4 - pregnadiene - 11β - ol - 3,20-dione in 50 cc. of tetrahydrofuran is treated at room temperature for 10 minutes with 40 cc. of a solution of boric acid in ethanol. The solvent is removed under reduced pressure and the residue, crystallized from ethanol, gives 9α - fluoro - 1,4 - pregnadiene - 11β,17α,21 - triol - 3,20-dione 17-acetate, M. Pt. 232–235° C.; [α]$_D$=+19° (dioxan).

In like manner, 9α-fluoro-1,4-pregnadiene-11β,17α,21-triol-3,20-dione 17-valerate is prepared by starting with 17α,21-(1'-methoxy)-pentylidenedioxy 9α-fluoro-1,4-pregnadiene-11β-ol-3,20-dione; 9α - chloro - 1,4 - pregnadiene-11β,17α,21-triol-3,20-dione 17(β-phenyl)propionate is prepared starting from 17α,21-(1'-methoxy-3'-phenyl)-propylidenedioxy - 9α - chloro - 1,4 - pregnadiene - 11β-ol-3,20-dione and 9α-bromo-1,4-pregnadiene-11β,17α,21-triol-3,20-dione 17-hexahydrobenzoate is prepared starting from 17α,21-(1'-methoxy) - hexahydrobenzylidenedioxy-9α-bromo-1,4-pregnadiene-11β-ol-3,20-dione.

*Example 13*

The treatment of 17α,21-(1'-methoxy)-ethylidenedioxy-5α-pregnane-3,11,20-trione in chloroacetic acid solution, by the above procedure yields 5α-pregnane-17α,21-diol-3,11,20-trione 17-acetate.

Similarly, hydrolyzing with propionic acid, 17α,21-(1'-methoxy) - ethylidenedioxy - 5α - pregnane - 11β - ol-3,20-dione yields 5α-pregnane-11β,17α,21-triol-3,20-dione 17-acetate melting at 210–213° C.; [α]$_D$=−10° (dioxan) and 17α,21-(1'-methoxy)-ethylidenedioxy-5α-pregnane-3,11β-diol-20-one yields 5α-pregnane-3,11β,17α,21-tetraol-20-one 17-acetate.

*Example 14*

To a solution of 0.5 g. of 3β-ethoxy-17α,21-(1'-methoxy)-ethylidenedioxy-5α-pregnane-20-one in ethanol, are added 0.5 cc. of N/2 formic acid. The reaction mixture is heated at 35° C. for 5 minutes and the solvent removed by evaporation under reduced pressure. The crude product is crystallized from ethanol yielding 3β-ethoxy-5α-pregnane-17α,21-diol-20-one 17-acetate.

When the starting product is 17α,21-(1'-ethoxy)-butylidenedioxy - 6α - methyl - 1,4 - pregnadiene - 11β - ol-3,20-dione the method described is followed, there is obtained 6α-methyl-1,4-pregnadiene-11β,17α,21-triol - 3,20-dione 17-butyrate.

Similarly, 17α,21-(1'-methoxy) - pentylidenedioxy - 2α-methyl-4-pregnene-3,11,20-trione is converted to 2α-methyl-4-pregnene-17α,21-diol-3,11,20-trione 17-valerate by hydrolysis with methanolic malonic acid.

*Example 15*

A mixture of 2.5 g. of 17α,21-(1'-ethoxy)-iso-butylidenedioxy-1-pregnene-3,11,20-trione, 25 cc. of benzene and 50 cc. of a solution of perchloric acid in methanol is heated at 20° C. and the solvent completely evaporated. The residue, crystallized from ethanol, yields 1-pregnene-17α,21-diol-3,11,20-trione 17-isobutyrate.

Similarly, 17α,21-(1'-propoxy) - decylidenedioxy - 4,6-pregnadiene-3,11,20 - trione, 17α,21-(1'-methoxy)-octylidenedioxy - 16β - methyl - 1,4 - pregnadiene - 11β - ol-3,20-dione and 17α,21-(1'-methoxy-2'-phenyl)-ethylidenedioxy-16α-methyl-1,4-pregnadiene-11β-ol-3,20 - dione are converted to 4,6-pregnadiene-17α,21-diol-3,11,20-trione 17-capronate, 16β-methyl-1,4-pregnadiene-11β-ol-3,20-dione 17-caprylate and 16α-methyl-1,4-pregnadiene-11β-ol-3,20-dione 17-phenylacetate respectively.

*Example 16*

3.5 g. of 17α,21-(1'-ethoxy)-benzylidenedioxy-4-chloro-5α-pregnane-3,20-dione dissolved in 50 cc. of methanol are treated at room temperature for 5 minutes with 6 cc. of perchloric acid. The solvent is removed from the resulting mixture and the residue, taken up with methanol gives 4-chloro-5α-pregnane-17α,21-diol-3,20 - dione 17-benzoate.

In the same manner as above and employing other 17α,21-(1'-alkoxy)-1'-substituted-methylenedioxy steroids, the following compounds are produced:

4-bromo-5α-pregnane-17α,21-diol-3,20-dione 17-isovalerate;
5α-pregnane-4,17α,21-triol-3,20-dione 17-propionate;
4-pregnene-6,11β,17α,21-tetraol-3,20-dione 17-capronate;
6-fluoro-4-pregnene-17α,21-diol-3,11,20-trione-17-butyrate;
4-pregnene-6,17α,21-triol-3,20-dione 17-acetate;
9α-fluoro-16α-methyl-1,4-pregnadiene-11β,17α,21-triol-3,20-dione 17-acetate;
9α-chloro-4-pregnene-11β,17α,21-triol-3,20-dione 17-hexahydrobenzoate;
19-nor-4-pregnene-11β,17α,21-triol-3,20-dione 17-valerate;
3β-propoxy-5α-pregnene-17α,21-triol-20-one 17-propionate;
5α-pregnane-3β,17α,21-triol-20-one 3-formate 17-valerate;
5α-pregnane-3β,17α,21-triol-20-one 3-acetate 17-butyrate;
5-pregnene-3β,17α,21-triol-20-one 3-benzoate 17-acetate;
4-pregnene-17α,21-diol-3,20-dione 17-β-carbomethoxypropionate;
9α-fluoro-4-pregnene-11β,17α,21-triol-3,20-dione 17-valerate.

*Example 17*

50 mg. of 17α,21-(1'-methoxy)-pentylidenedioxy-9α-fluoro-1,4-pregnadiene-11β,16α-diol-3,20-dione are dissolved in 5 cc. of ethanol and the resulting mixture is treated with 0.5 cc. of oxalic acid at 40° C. for few minutes. Then the solvent is evaporated in vacuo and the residue taken up with dilute methanol yields 9α-fluoro-1,4-pregnadiene-11β,16α,17α,21 - tetraol - 3,20 - dione 17-valerate.

We claim:

1. The process for preparing a 17α-acyloxy-21-hydroxy-20-keto-pregnane having at the 17-position the structure:

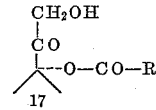

where R is a member selected from the group consisting of aliphatic hydrocarbon radicals of from 1 to 9 carbon atoms, cycloaliphatic hydrocarbon radicals of from 4 to 6 carbon atoms, arylaliphatic hydrocarbon radicals having at least 7 and no more than 8 carbon atoms, phenyl, β-carboxyethyl and β-carbomethoxyethyl, which process comprises hydrolyzing in the presence of an acid, a 17α,21-(1'-alkoxy)-1'-substituted methylenedioxy steroid having at the 17-position the structure:

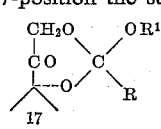

in which R is as defined above and $R^1$ represents lower alkyl of from 1 to 3 carbon atoms.

2. The process of claim 1 in which the acid is a mineral acid selected from the group consisting of sulfuric acid, phosphoric acid, boric acid, perchloric acid and hydrochloric acid.

3. The process of claim 1 in which the acid is an organic acid selected from the group consisting of formic acid, acetic acid, propionic acid, chloroacetic acid, oxalic acid and malonic acid.

4. The process of claim 1 in which the acid hydrolysis is carried out at a temperature within the range of 20° C.–80° C.

5. A process for preparing 1,4-pregnadiene-11β,17α,21-triol - 3,20 - dione 17 - valerate comprising hydrolyzing 17α,21 - (1' - methoxy) - n - pentylidenedioxy - 1,4 - pregnadiene-11β-ol-3,20-dione at a temperature within the range of 20° C.–80° C. in the presence of hydrochloric acid.

6. A process for preparing 4-pregnene-17α,21-diol-3,20-dione 17-acetate comprising hydrolyzing 17α,21-(1'-methoxy)-ethylidenedioxy-4-pregnene-3,20-dione at a temperature within the range of 20° C.–80° C. in the presence of oxalic acid.

7. A process for preparing 4-pregnene-17α,21-diol-3,20-dione 17-valerate comprising hydrolyzing 17α,21-(1'-methoxy)-n-pentylidenedioxy-4-pregnene-3,20-dione at a temperature within the range of 20° C.–80 °C. in the presence of hydrochloric acid.

8. A process for preparing 4-pregnene-17α,21-diol-3,20-dione 17-hemisuccinate comprising hydrolyzing 17α,21-(1' - methoxy - 3' - carboxy) - propylidenedioxy - 4 - pregnene-3,20-dione at a temperature within the range of 20° C.–80° C. in the presence of hydrochloric acid.

9. A process for preparing 4-pregnene-17α,21-diol-3,20-dione 17-caproate comprising hydrolyzing 17α,21-(1'-methoxy)-n-hexylidenedioxy-4-pregnene-3,20-dione at a temperature within the range of 20° C.–80° C. in the presence of hydrochloric acid.

10. A compound selected from the group consisting of a steroid compound of the formula:

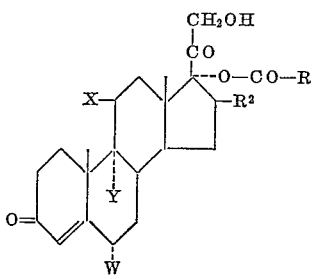

where R is a member selected from the group consisting of aliphatic hydrocarbon radicals of from 1 to 9 carbon atoms, cycloaliphatic hydrocarbon radicals of from 4 to 6 carbon atoms, arylaliphatic hydrocarbon radicals of at least 7 and no more than 8 carbon atoms, phenyl, β-carboxyethyl and β-carbomethoxyethyl, $R^2$ is a member selected from the group consisting of hydrogen, α-methyl, β-methyl and α-hydroxy, X is selected from the group consisting of hydrogen, ketonic oxygen and β-hydroxy, Y is selected from the group consisting of hydrogen, fluoro, chloro and bromo, and W is selected from the group consisting of hydrogen, halogen, methyl and hydroxy; and $\Delta^1$-dehydro derivatives of said steroid compound.

11. A compound of the formula:

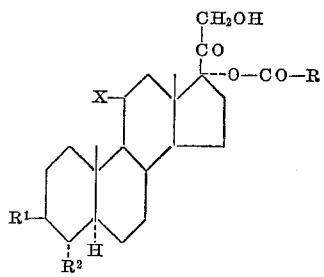

where R is a member selected from the group consisting of aliphatic hydrocarbon radicals of from 1 to 9 carbon atoms, cycloaliphatic hydrocarbon radicals of from 4 to 6 carbon atoms, arylaliphatic hydrocarbon radicals of at least 7 and no more than 8 carbon atoms, phenyl, β-carboxyethyl and β-carbomethoxyethyl, $R^1$ is a member selected from the group consisting of oxygen, α-hydroxy, β-hydroxy, lower alkoxy of from 1 to 3 carbon atoms, lower alkanoyloxy of from 1 to 3 carbon atoms and benzoyloxy; $R^2$ is a member selected from the group consisting of hydrogen, chloro, bromo and hydroxy and X is a member selected from the group consisting of hydrogen, ketonic oxygen and β-hydroxy.

12. 4,9(11) - pregnadiene - 17α,21 - diol - 3,20 - dione 17-acetate.

13. 1 - pregnene - 17α,21 - diol - 3,11,20 - trione 17-isobutyrate.

14. 19 - nor - 4 - pregnene - 11β,17α,21 - triol - 3,20-dione 17-valerate.

15. 4,6 - pregnadiene - 17α,21 - diol - 3,11,20 - trione 17-capronate.

16. 9α - fluoro - 1,4 - pregnadiene - 11β,16α,17α,21-tetraol-3,20-dione 17-valerate.

17. Prednisolone 17-valerate.

18. 4-pregnene-17α,21-diol-3,20-dione 17-acetate.

19. 4-pregnene-17α,21-diol-3,20-dione 17-valerate.

20. 4 - pregnene - 17α,21 - diol - 3,20 - dione 17-hemisuccinate.

21. 4-pregnene-17α,21-diol-3,20-dione 17-caproate.

22. 9α - fluoro - 4 - pregnene - 11β,17α,21 - triol - 3,20-dione 17-valerate.

References Cited in the file of this patent
UNITED STATES PATENTS

| | | |
|---|---|---|
| 2,864,839 | Fried | Dec. 16, 1958 |
| 2,932,656 | Day | Apr. 12, 1960 |
| 2,971,886 | Babcock | Feb. 14, 1961 |

OTHER REFERENCES

Gould et al.: J.A.C.S. 79, pp. 502–03 (1957).
Fieser et al.: Steroids, pp. 682, 691, 696 and 724, Reinhold Pub. Co., N.Y., 1959 ed.
Smith et al.: J.A.C.S., 82, 1962, pp. 4625–4629.
Bernstein et al.: J.A.C.S., 82, 1960, pp. 3685–3689.
Tanabe et al.: J.A.C.S. 83, Feb. 5, 1961, pp. 756 and 757.